US012631947B2

(12) United States Patent
Li

(10) Patent No.: US 12,631,947 B2
(45) Date of Patent: May 19, 2026

(54) PLUG-IN FILM STRUCTURE AND PROJECTION LAMP THEREOF

(71) Applicant: Shanxia Li, Zhongshan (CN)

(72) Inventor: Shanxia Li, Zhongshan (CN)

( * ) Notice: Subject to any disclaimer, the term of this patent is extended or adjusted under 35 U.S.C. 154(b) by 4 days.

(21) Appl. No.: 18/827,869

(22) Filed: Sep. 9, 2024

(65) Prior Publication Data

US 2026/0072334 A1     Mar. 12, 2026

(51) Int. Cl.
*G03B 21/14*        (2006.01)
*G03B 21/64*        (2006.01)

(52) U.S. Cl.
CPC ........... *G03B 21/145* (2013.01); *G03B 21/64* (2013.01)

(58) Field of Classification Search
CPC .............................. G03B 21/64; G03B 21/145
See application file for complete search history.

(56) References Cited

U.S. PATENT DOCUMENTS

| | | | | | |
|---|---|---|---|---|---|
| 2,109,767 | A | * | 3/1938 | Cook | F16F 15/10 464/180 |
| 2,999,424 | A | * | 9/1961 | Mccammon | G03B 23/048 353/116 |
| 12,313,964 | B1 | * | 5/2025 | Miller | G09B 27/04 |
| 2011/0007496 | A1 | * | 1/2011 | Chien | F21S 8/035 348/E9.025 |
| 2021/0247039 | A1 | * | 8/2021 | Zheng | F21V 14/08 |
| 2022/0404633 | A1 | * | 12/2022 | Liu | G03B 23/105 |

* cited by examiner

*Primary Examiner* — Abdulmajeed Aziz
*Assistant Examiner* — Nathaniel J Lee
(74) *Attorney, Agent, or Firm* — Jose Cherson Weissbrot

(57) ABSTRACT

Disclosed is a novel plug-in film structure, including a rotary motor. A rotating shaft of the rotary motor is provided with rotary teeth. The novel plug-in film structure further includes a gear mechanism and a film mechanism. One end of the gear mechanism is meshed with the rotary teeth, and the film mechanism is magnetically connected to the other end of the gear mechanism. When the rotary motor rotates, a film sheet in the film mechanism magnetically connected to the gear mechanism rotates synchronously. The present disclosure has advantages of simple structure and convenient use. A rotary column with a magnetic block is provided, which can be quickly connected to a magnetic assembly. In addition, the magnetic connection structure enables a film assembly to rotate stably. Moreover, the entire magnetic assembly can be separated from a tray, so that film sheets with different images can be quickly replaced.

14 Claims, 6 Drawing Sheets

PLUG-IN FILM STRUCTURE AND PROJECTION LAMP THEREOF

TECHNICAL FIELD

The present disclosure relates to the technical field of projection lamps, and in particular to a novel plug-in film structure and a projection lamp thereof.

BACKGROUND

Projection lamps are a type of electric appliance devices that can project images or words on a ground or wall, which are mostly used to create an atmosphere at present.

All projection lamps on the market can replace films to project different images. When different images are replaced, different film sheets need to be replaced. In some prior arts, the use of gear transmission enables a film sheet to rotate. In such structure, a gear rack needs to be arranged at an outer peripheral edge of the film sheet to realize gear driving. However, improper use may cause slip or damage to the gear rack of the film sheet, causing a failure in normal use.

SUMMARY

Aiming at the shortcomings of the prior art, a purpose of the present disclosure is to provide a novel plug-in film structure and a projection lamp thereof, so as to make a film rotate more flexibly through innovative magnetic connection.

To realize the above purpose, the present disclosure adopts the following technical solution.

A novel plug-in film structure includes a rotary motor. A rotating shaft of the rotary motor is provided with rotary teeth. The novel plug-in film structure further includes a gear mechanism and a film mechanism, where one end of the gear mechanism is meshed with the rotary teeth, and the film mechanism is magnetically connected to the other end of the gear mechanism. When the rotary motor rotates, a film sheet in the film mechanism magnetically connected to the gear mechanism rotates synchronously.

It should be noted that the gear mechanism includes transmission teeth, a rotary column and magnetic blocks. One side of the transmission teeth is meshed with the rotary teeth, and the other side of the transmission teeth is meshed with a gear arranged at an outer peripheral edge of the rotary column. A plurality of magnetic blocks are arranged on a top of the rotary column. When the rotary motor rotates, a film sheet in the film mechanism magnetically connected to the plurality of magnetic blocks rotate synchronously.

It should be noted that the film mechanism includes a tray, a magnetic assembly and a film assembly. The film assembly is arranged in the magnetic assembly. The magnetic assembly is movably arranged in the tray. During magnetic connection, the plurality of magnetic blocks and the magnetic assembly magnetically attract each other. When the rotary motor rotates, the magnetic assembly and the film assembly rotate synchronously.

It should be noted that the magnetic assembly includes a fixing seat and a magnetic ring. A bottom of the fixing seat is provided with an annular slot, the magnetic ring is embedded in the annular slot, the film assembly is arranged in the fixing seat, and the fixing seat is movably arranged in the tray, where when the fixing seat is magnetically connected, and the plurality of magnetic blocks and the magnetic ring magnetically attract each other.

It should be noted that the film assembly includes a film holder, a film cover and a film sheet. The film sheet is arranged in the film holder, and the film cover covers a top of the film holder, where the film holder is mounted in the fixing seat.

It should be noted that a movable gap is provided between the fixing seat and the tray.

It should be noted that the rotary column and the film sheet are arranged coaxially.

The present disclosure further provides a projection lamp including the foregoing novel plug-in film structure, including:

a core rack, the gear mechanism and the film mechanism being respectively arranged in the core rack;

a light emitting mechanism, the light emitting mechanism including a light source, a light gathering cup and a lens, where the light gathering cup and the lens are sequentially arranged on one side of an irradiating surface of the light source; and a focusing mechanism, the focusing mechanism including a camera lens, and the camera lens being movable along an axis direction thereof to adjust a focal distance, where the core rack is provided with an open groove, and the film mechanism is movably inserted into the open groove.

It should be noted that the core rack includes an upper rack body and a lower rack body that are snap-fitted with each other. The lower rack body is provided with a tube sleeve; the light source is located at a bottom of the tube sleeve; the light gathering cup and the lens are sequentially arranged in the tube sleeve; the tube sleeve is sleeved inside the rotary column; the open groove is formed at the upper rack body; and the focusing mechanism is connected to the upper rack body.

It should be noted that the focusing mechanism further includes a focusing seat, a clamping seat and a nut. A top of the upper rack body is provided with a mounting hole; the nut is arranged in the mounting hole; the camera lens is connected to the clamping seat; the clamping seat is mounted in the focusing seat; a surface of an inner side surface of the nut is provided with an internal thread; and a surface of an outer side wall of the camera lens is provided with an external thread matching with the internal thread.

The present disclosure has advantages of simple structure and convenient use. The rotary column with the magnetic blocks is provided, which can be quickly connected to the magnetic assembly. In addition, the magnetic connection structure of the present disclosure enables the film assembly to rotate stably. Moreover, the entire magnetic assembly can be separated from the tray, so that film sheets with different images can be quickly replaced.

DETAILED DESCRIPTION

The following further describes the present disclosure with reference to the accompanying drawings. It should be noted that the embodiment provides a detailed implementation and specific operation process based on the technical solution, but the protection scope of the present disclosure is not limited to this embodiment.

Figure 1:
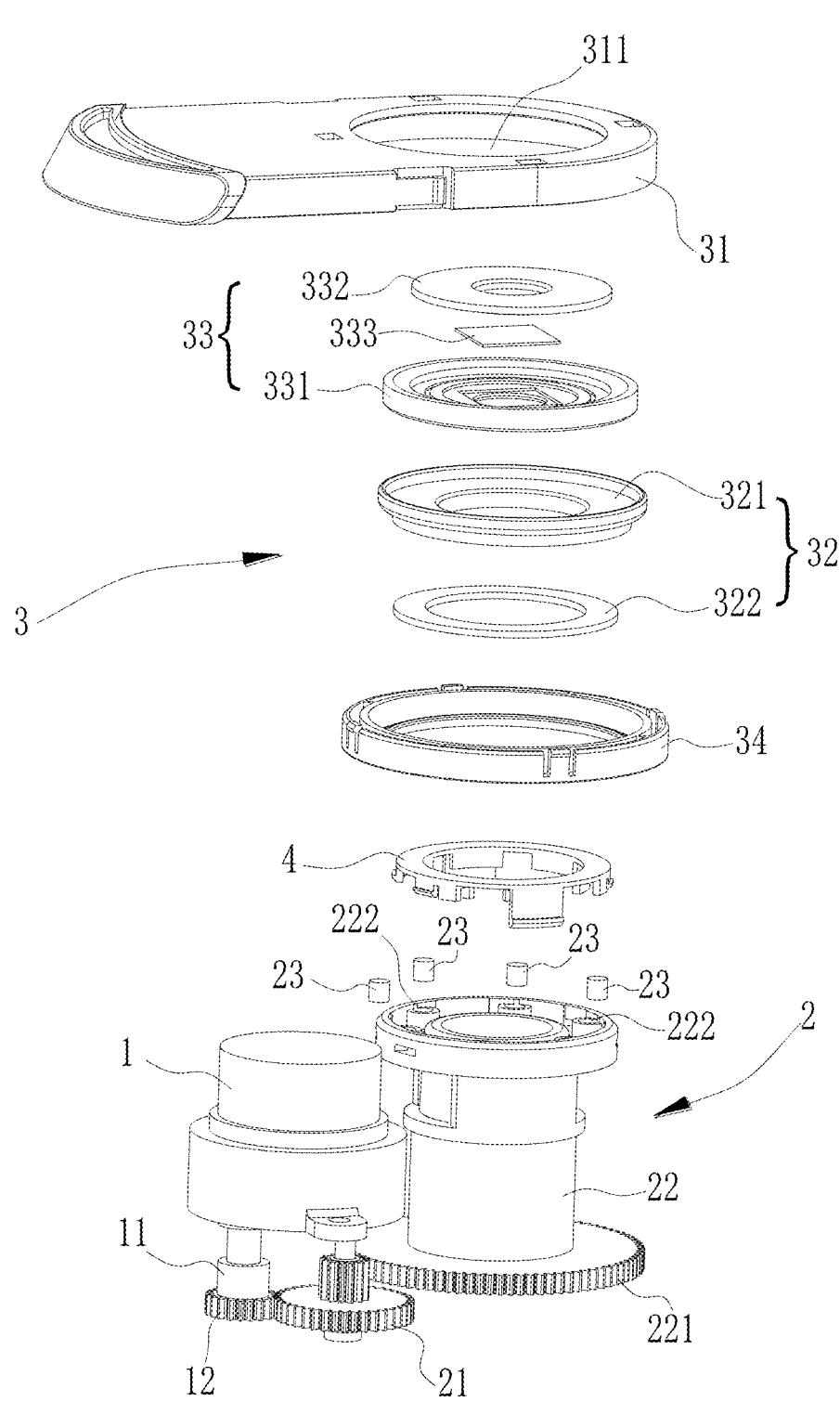
FIG. 1 is a schematic diagram of a novel plug-in film structure of the present disclosure.
Figure 2:
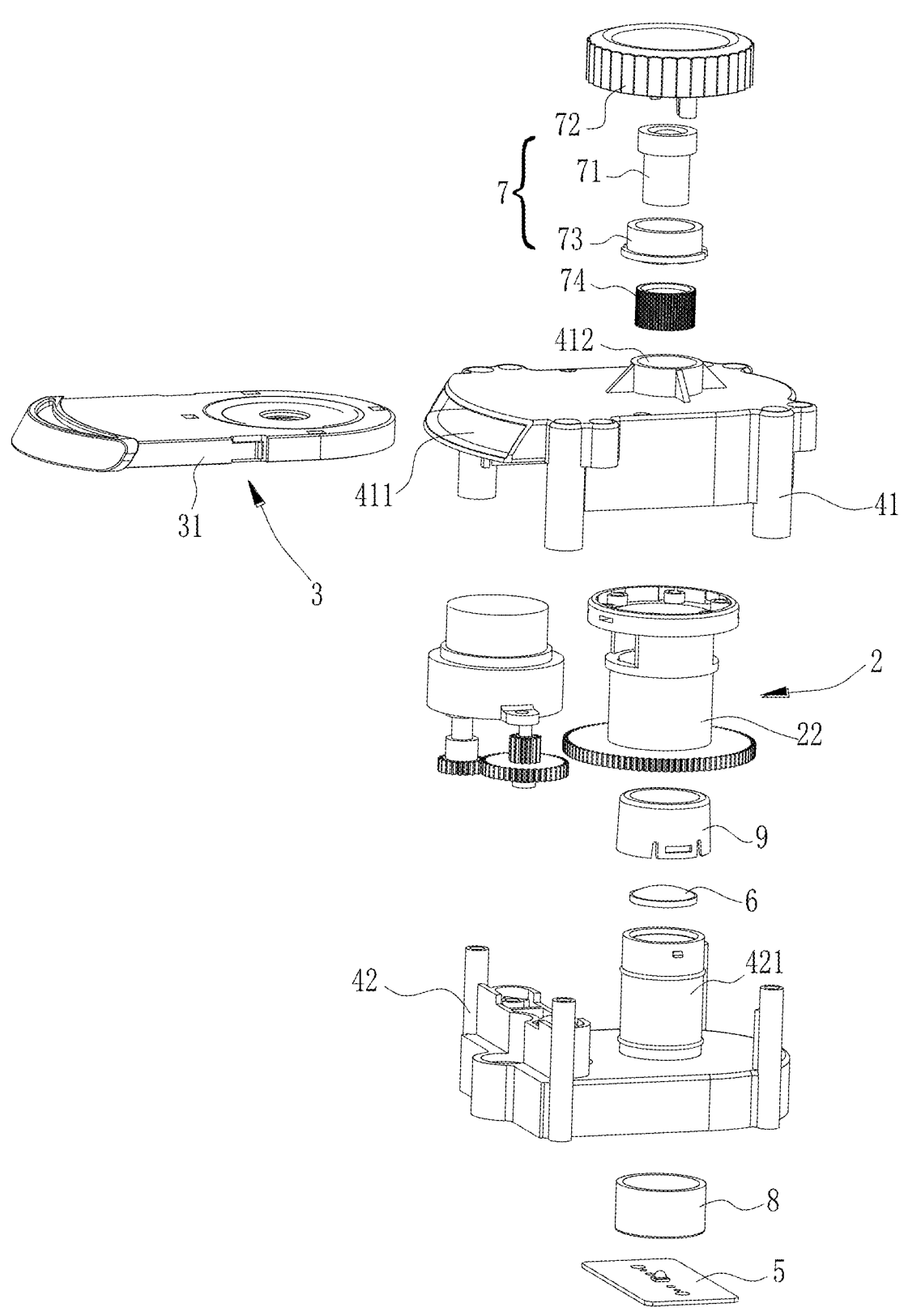
FIG. 2 is a schematic structural diagram of a core rack, a light emitting mechanism and a focusing mechanism of the present disclosure.

As shown in FIG. 1 and FIG. 2, the present disclosure provides a novel plug-in film structure, including a rotary motor 1. A rotating shaft 11 of the rotary motor 1 is provided with rotary teeth 12. The novel plug-in film structure further includes a gear mechanism 2 and a film mechanism 3. One end of the gear mechanism 2 is meshed with the rotary teeth 12, and the film mechanism 3 is magnetically connected to the other end of the gear mechanism 2. When the rotary motor 1 rotates, a film sheet 333 in the film mechanism 3 magnetically connected to the gear mechanism 2 rotates synchronously.

It should be noted that in the present disclosure, the rotary motor is used as a drive unit, but as a replacement of a power source, other drive units in the prior art may alternatively be used, for example, screw driving, belt driving, and chain driving.

Further, as shown in FIG. 1, the gear mechanism 2 of the present disclosure includes transmission teeth 21, a rotary column 22 and magnetic blocks 23. One side of the transmission teeth 21 is meshed with the rotary teeth 12, and the other side of the transmission teeth 21 is meshed with a gear 221 arranged at an outer peripheral edge of the rotary column 22. A plurality of magnetic blocks 23 are arranged on a top of the rotary column 22. When the rotary motor 1 rotates, the film sheet 333 in the film mechanism 3 magnetically connected to the plurality of magnetic blocks 23 rotate synchronously.

Further, as shown in FIG. 1, in the above structure, to maintain the structural integrity of the rotary column, the rotary column 22 and the gear 221 thereof are integrally formed structures. The top of the rotary column 22 may be provided with mounting grooves 222 as many as the magnetic blocks 23, and the magnetic blocks 23 are correspondingly placed in the mounting groove 222. Furthermore, in the present disclosure, a magnetic block cover plate 4 is further provided, and the magnetic block cover plate 4 covers the top of the rotary column 22, to prevent the magnetic blocks 23 from falling out accidentally.

In a preferred technical solution, slow rotation of the rotary column can be realized by adjusting a tooth ratio of the rotary teeth, the transmission teeth and the gear of the rotary column in the present disclosure, so that pattern effects of starry sky/galaxy/planets projected by the film sheet are more similar to the outer space.

Further, as shown in FIG. 1, the film mechanism 3 of the present disclosure includes a tray 31, a magnetic assembly 32 and a film assembly 33. The film assembly 33 is arranged in the magnetic assembly 32. The magnetic assembly 32 is movably arranged in the tray 31. During magnetic connection, the plurality of magnetic blocks 23 and the magnetic assembly 32 magnetically attract each other. When the rotary motor 1 rotates, the magnetic assembly 32 and the film assembly 33 rotate synchronously.

It should be noted that the tray 31 of the present disclosure is provided with a cavity 311, where a structure formed by combining the magnetic assembly 32 and the film assembly 33 is arranged in the cavity 311.

Further, as shown in FIG. 1, the magnetic assembly 32 of the present disclosure includes a fixing seat 321 and a magnetic ring 322. A bottom of the fixing seat 321 is provided with an annular slot, the magnetic ring 322 is embedded in the annular slot, the film assembly 33 is arranged in the fixing seat 321, and the fixing seat 321 is movably arranged in the tray 31, where when the fixing seat 321 is magnetically connected, the plurality of magnetic blocks 23 and the magnetic ring 322 magnetically attract each other.

In a preferred technical solution, the magnetic ring in the present disclosure is an iron sheet. The iron sheet is fixedly arranged in the annular slot at the bottom of the fixing seat through embedding connection, thereby effectively preventing the iron sheet from accidentally leaving from the annular slot.

Certainly, the magnetic ring of the present disclosure may alternatively be replaced with other materials that can provide magnetic connection in the prior art.

Further, as shown in FIG. 1, the film assembly 33 of the present disclosure includes a film holder 331, a film cover 332 and a film sheet 333. The film sheet 333 is arranged in the film holder 331, and the film cover 332 covers a top of the film holder 331, where the film holder 331 is mounted in the fixing seat 321.

In a preferred technical solution, the film holder in the present disclosure is provided with a film arrangement position inside, and the film sheet is arranged at the film arrangement position to prevent shaking of the film sheet. In addition, the film cover and the film holder are connected in a press-fitting manner, ensuring that the film sheet is unlikely to be oxidized by external air.

Further, the film holder in the present disclosure may be mounted in the fixing seat in a movable connection manner, for example, in an existing movable connection manner such as snap-fit connection or interference-fit connection.

Figure 3:
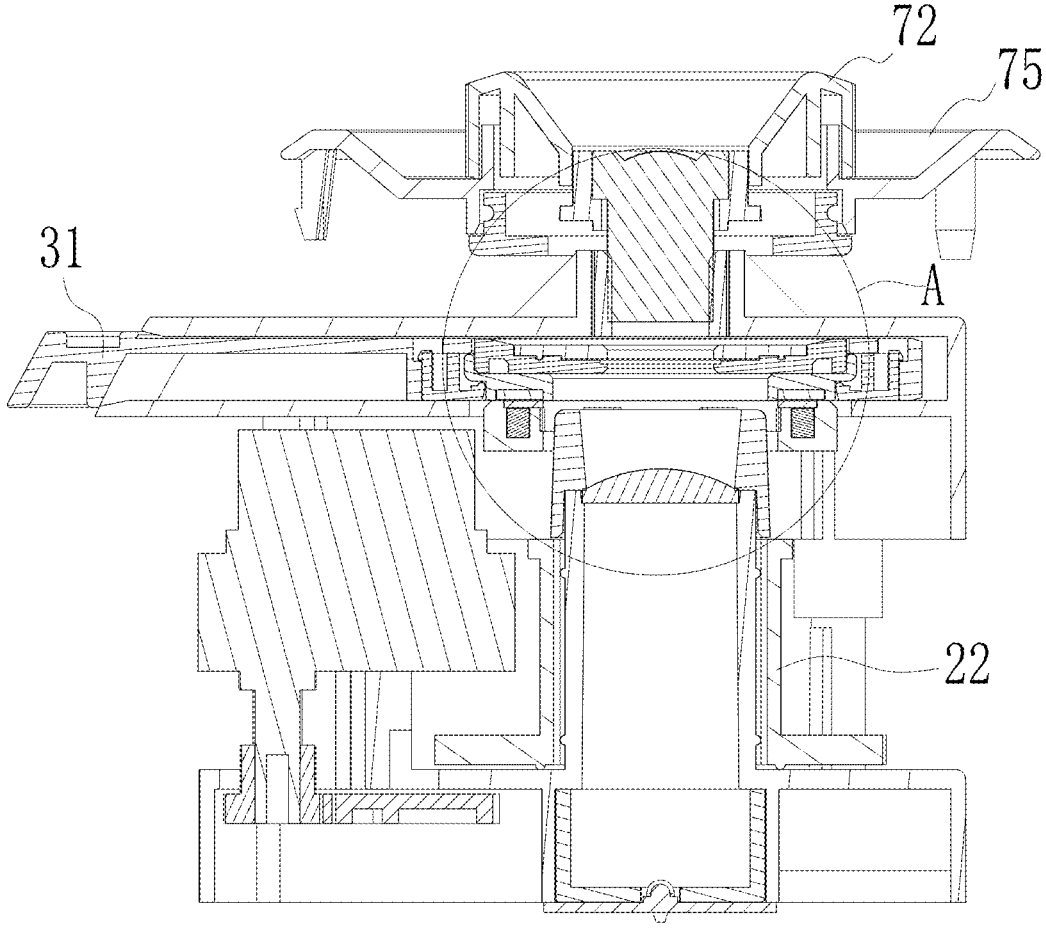
FIG. 3 is a schematic cross-sectional view of a novel plug-in film structure of the present disclosure.
Figure 4:
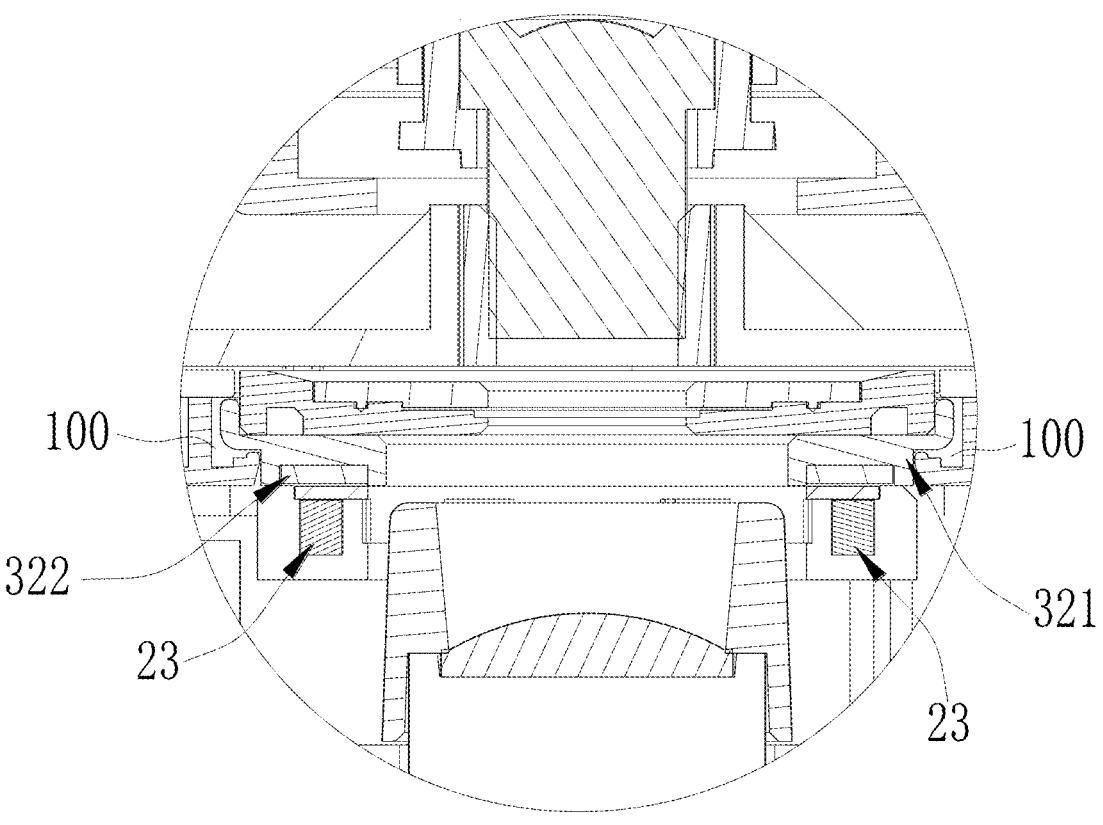
FIG. 4 is an enlarged schematic structural diagram of portion A in FIG. 3.

Further, as shown in FIG. 1, FIG. 3 and FIG. 4, to enable the magnetic assembly 32 to rotate normally in the tray 31, a movable gap 100 is provided between the fixing seat 321 and the tray 31 in the present disclosure.

It should be noted that as shown in FIG. 1, in the present disclosure, a tray pedestal 34 is further provided. The tray pedestal 34 is snap-fitted with a bottom of the tray 31. The tray pedestal 34 and the cavity 311 of the tray 31 form a chamber capable of accommodating the magnetic assembly 32. After magnetic connection, the magnetic assembly 32 of the present disclosure rotates in the chamber.

In a preferred technical solution, the magnetic assembly of the present disclosure may be mounted in the chamber in a movable connection manner such as snap fit or interference fit, or in another existing movable connection manner.

Furthermore, as shown in FIG. 1, FIG. 3 and FIG. 4, the movable gap 100 in the foregoing structure is for ensuring that the magnetic assembly 32 can rotate normally under the driving of the rotary column 22 after the magnetic ring 322 of the magnetic assembly 32 is magnetically connected to the magnetic blocks 23, so that the film sheet 333 in the film assembly 33 rotates. For this reason, the movable gap 100 is provided between a peripheral edge of the fixing seat 321 of the magnetic assembly 32 and the chamber, that is, an outer diameter of the fixing seat is smaller than an inner diameter of the chamber. In such structure, when the magnetically connected magnetic assembly 32 rotates, the movable gap 100 ensures that the fixing seat 321 does not rub against an inner side wall of the chamber formed by the tray 31 and the tray pedestal 34 while rotating, thereby realizing normal rotation. Certainly, it can also be understood that the magnetic assembly has a certain movement space in the chamber formed by the tray and the tray pedestal.

It should be noted that to realize normal projection of the film sheet, the rotary column, the fixing seat, the magnetic ring, the film holder, the film cover and the film sheet of the present disclosure are all arranged coaxially. Further, the rotary column, the magnetic block cover plate, the fixing seat, the magnetic ring, the film holder, the film cover and the tray pedestal are all hollow structures.

In a preferred technical solution, it is described above that the magnetic assembly of the present disclosure can be mounted in the chamber of the tray in a movable connection manner such as snap fit or interference fit. Therefore, in an embodiment, the present disclosure may be provided with a plurality of magnetic assemblies, and different magnetic assemblies have film sheets with different images, so users can project different images by replacing the magnetic assemblies, improving the experience and interest of the present disclosure.

Certainly, the film holder of the film assembly of the present disclosure can be connected to the fixing seat of the magnetic assembly in an existing movable connection manner such as snap fit or interference fit. Therefore, in another embodiment, only a plurality of different film assemblies are provided. The users can switch different projected images by directly replacing the film assembly.

As shown in FIG. 2, based on the foregoing novel plug-in film structure, the present disclosure further provides a projection lamp including such structure. Specifically, the projection lamp includes:

a core rack 4, the gear mechanism 2 and the film mechanism 3 being respectively arranged in the core rack 4;

a light emitting mechanism, the light emitting mechanism including a light source 5, a light gathering cup and a lens 6, where the light gathering cup and the lens 6 are sequentially arranged on one side of an irradiating surface of the light source 5; and a focusing mechanism 7, the focusing mechanism 7 including a camera lens 71, and the camera lens 71 being movable along an axis direction thereof to adjust a focal distance, where the core rack 4 is provided with an open groove 411, and the film mechanism 3 is movably inserted into the open groove 411.

Further, as shown in FIG. 2, the core rack 4 of the present disclosure includes an upper rack body 41 and a lower rack body 42 that are snap-fitted with each other. The lower rack body 42 is provided with a tube sleeve 421; the light source 5 is located at a bottom of the tube sleeve 421; the light gathering cup and the lens 6 are sequentially arranged in the tube sleeve 421; the tube sleeve 421 is sleeved inside the rotary column 22; the open groove 411 is formed at the upper rack body 41; and the focusing mechanism 7 is connected to the upper rack body 41.

Further, as shown in FIG. 2, the present disclosure further includes a light gathering holder 8. The light gathering holder 8 is also arranged in the tube sleeve 421 and is configured to support the light gathering cup.

It should be noted that as shown in FIG. 2, the tube sleeve 421 of the present disclosure is also a hollow structure and is arranged coaxial to the rotary column 22.

To ensure that the tube sleeve after sleeving does not affect normal rotation of the rotary column, a gap is present between the tube sleeve and the rotary column, that is, an outer diameter of the tube sleeve is smaller than an inner diameter of the rotary column.

In addition, as shown in FIG. 2, to protect the lens 6 in the light emitting mechanism, the present disclosure further includes a lens cap 9. Specifically, a peripheral edge of a top of the tube sleeve 421 is provided with an accommodating groove for the lens. The lens 6 is arranged in the accommodating groove. The lens cap 9 covers the top of the tube sleeve 421 to protect the lens 6.

Further, as shown in FIG. 2, the tray 31 of the present disclosure is movably inserted into the open groove 411. After the tray 31 is entirely inserted into the open groove 411, the plurality of magnetic blocks on the rotary column 22 are magnetically connected to the magnetic ring (iron sheet) in the fixing seat, that is, the plurality of magnetic blocks firmly attract the magnetic assembly.

Correspondingly, a bottom of the open groove is provided with a circular hole, and the circular hole corresponds to a position of the chamber formed by the tray pedestal and the cavity of the tray.

Further, as shown in FIG. 2, the focusing mechanism 7 of the present disclosure further includes a focusing seat 72, a clamping seat 73 and a nut 74. A top of the upper rack body 41 is provided with a mounting hole 412. The nut 74 is arranged in the mounting hole 412. The camera lens 71 is connected to the clamping seat 73. The clamping seat 73 is mounted in the focusing seat 72. A surface of an inner side wall of the nut 74 is provided with an internal thread, and a surface of an outer side wall of the camera lens 71 is provided with an external thread that matches with the internal thread.

It should be noted that the camera lens is mounted in the clamping seat, the clamping seat is mounted in the focusing seat, and by virtue of a threaded connection between the camera lens and the nut, when the focusing seat is rotated, the camera lens can move up or down along an axis thereof relative to the nut, so that a focal distance is changed, realizing resolution adjustment of projected images.

Figure 5:
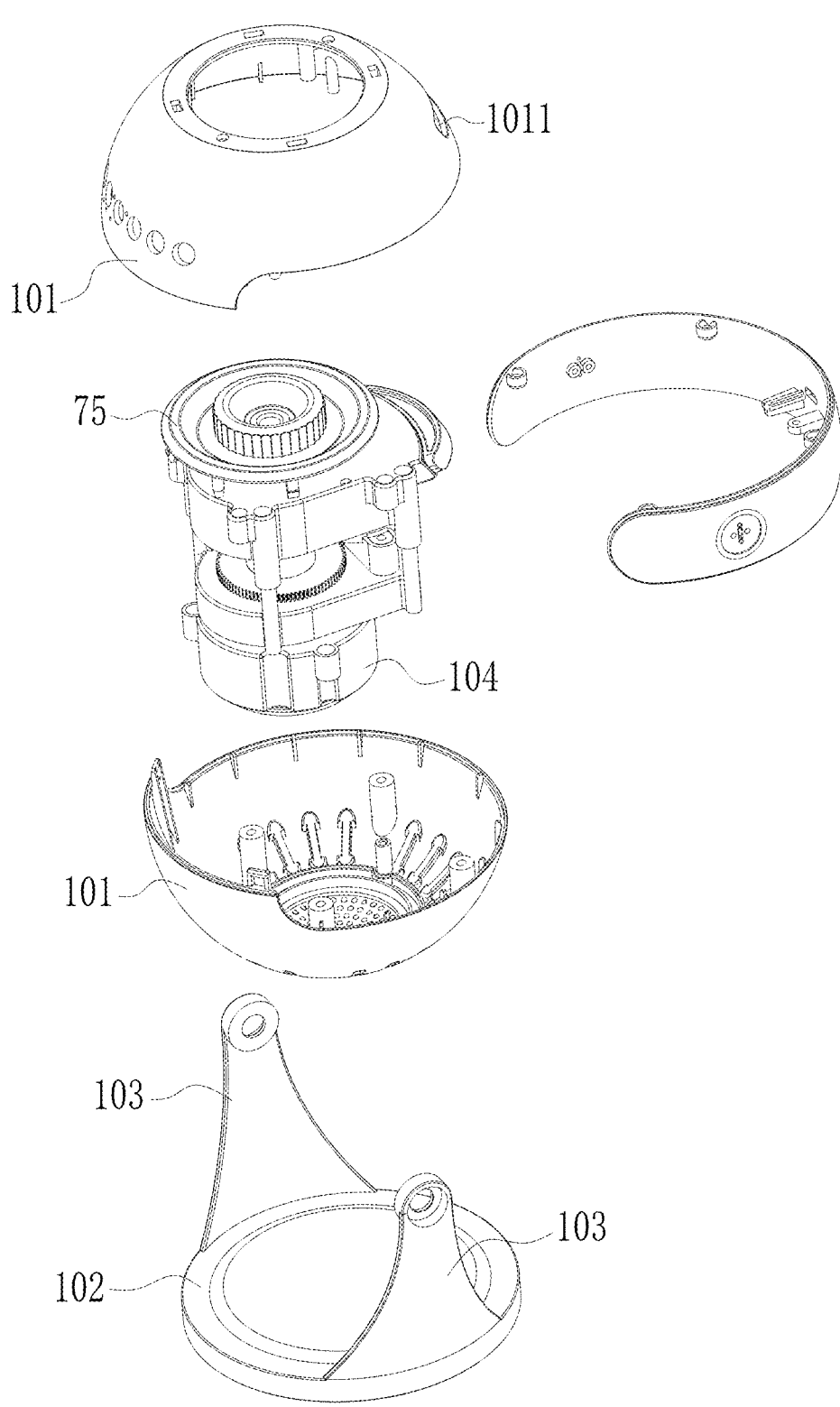
FIG. 5 is a schematic structural diagram of a projection lamp of the present disclosure.
Figure 6:
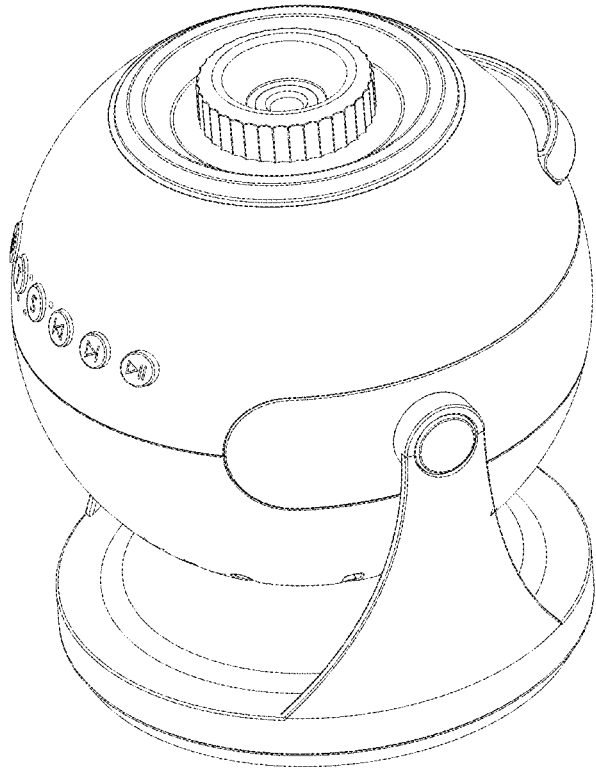
FIG. 6 is a schematic diagram of an assembled projection lamp of the present disclosure.

Further, the present disclosure should also include a housing 101. As an embodiment, FIG. 5 shows that the housing of the present disclosure is spherical. In fact, the housing may be of any shape. In addition, the housing 101 is provided with an opening 1011. The opening 1011 corresponds to a position of the foregoing open groove and is used for inserting the tray of the film assembly.

Furthermore, as shown in FIG. 3 and FIG. 5, the present disclosure is further provided with a base 75, and the base 75 covers a top of the housing 101. In addition, the focusing seat 71 is movably connected to the base 75.

As shown in FIG. 5, in addition to the foregoing housing 101, a base 102 may be further additionally arranged on the housing 101. The base 102 is provided with a pair of support arms 103. This pair of support arms 103 are respectively rotatably connected to two sides of the housing 101. In this way, the present disclosure can realize adjustment of different projection angles.

To further enrich the functions of the present disclosure, in a preferred technical solution, as shown in FIG. 5, the present disclosure may be further provided with a loudspeaker 104 in the housing 101, thereby creating a better atmosphere by synchronously playing music through the loudspeaker while projecting the image.

It should be noted that the present disclosure includes a control circuit and a battery that can be charged and discharged cyclically. Further, functions of the control circuit are the same as those of the prior art, for example, for controlling start or shutdown of the present disclosure, start or shutdown of the rotary motor, and the like.

Further, a basic light path of the present disclosure is as follows:

light source-light gathering cup-lens-film sheet-camera lens.

EMBODIMENTS

When the present disclosure is in use, the tray is inserted into the open groove along the opening of the housing. When the tray is entirely inserted into the open groove, the plurality of magnetic blocks at the top of the rotary column are magnetically connected to the magnetic ring (iron sheet) at the bottom of the fixing seat. Since the magnetic assembly has a certain movement space in the chamber formed by the tray and the tray pedestal, the position of the magnetic assembly is relatively fixed after magnetic connection. At that moment, the present disclosure is started, the light source is turned on, the rotary teeth of the rotary motor rotate, then the rotary teeth of the rotary column are driven by the transmission teeth, and then the rotary column rotates synchronously. Further, the plurality of magnetic blocks mounted at the top of the rotary column rotate synchronously. Since the plurality of magnetic blocks are magnetically connected to the magnetic ring (iron sheet) of the magnetic assembly, the magnetic assembly rotates synchronously, so that the film assembly mounted on the magnetic assembly rotates synchronously, ultimately enabling images projected through the camera lens to rotate.

In addition, the users can adjust and obtain clear projected images by rotating the focusing seat to move the camera lens up or down.

Ultimately, as described above, the users can obtain different projected images by replacing the magnetic assembly or the film assembly.

Persons skilled in the art can make various corresponding modifications and variations according to the above technical solutions and concepts, and all these modifications and variations should be included in the protection scope of the claims of the present disclosure.

What is claimed is:

1. A novel plug-in film structure, comprising a rotary motor, a rotating shaft of the rotary motor being provided with rotary teeth, wherein the novel plug-in film structure further comprises a gear mechanism and a film mechanism, one end of the gear mechanism is meshed with the rotary teeth, and the film mechanism is magnetically connected to the other end of the gear mechanism; and when the rotary motor rotates, a film sheet in the film mechanism magnetically connected to the gear mechanism rotates synchronously;

wherein the gear mechanism comprises a rotary column, and a plurality of magnetic blocks arranged on a top of the rotary column;

the film mechanism comprises a tray, a magnetic assembly, and a film assembly; the film assembly is arranged in the magnetic assembly; the magnetic assembly is movably arranged in the tray; during magnetic connection, the plurality of magnetic blocks and the magnetic assembly magnetically attract each other; and when the rotary motor rotates, the magnetic assembly and the film assembly rotate synchronously;

wherein the magnetic assembly comprises a fixing seat and a magnetic ring, the magnetic ring is arranged on a bottom of the fixing seat, the film assembly is arranged in the fixing seat and is spaced apart from the magnetic ring by the fixing seat, and the fixing seat is movably arranged in the tray, when the fixing seat is magnetically connected, the plurality of magnetic blocks and the magnetic ring magnetically attracting each other.

2. The novel plug-in film structure according to claim 1, wherein the gear mechanism further comprises transmission teeth; one side of the transmission teeth is meshed with the rotary teeth, and the other side of the transmission teeth is meshed with a gear arranged at an outer peripheral edge of the rotary column.

3. The novel plug-in film structure according to claim 1, wherein the film assembly comprises a film holder, a film cover and a film sheet, the film sheet is arranged in the film holder, and the film cover covers a top of the film holder, the film holder being mounted in the fixing seat.

4. The novel plug-in film structure according to claim 1, wherein a movable gap is provided between the fixing seat and the tray.

5. The novel plug-in film structure according to claim 1, wherein the rotary column and the film sheet are arranged coaxially.

6. A projection lamp comprising the novel plug-in film structure according to claim 1, comprising:

a core rack, the gear mechanism and the film mechanism being respectively arranged in the core rack;

a light emitting mechanism, the light emitting mechanism comprising a light source, a light gathering cup and a lens, wherein the light gathering cup and the lens are sequentially arranged on one side of an irradiating surface of the light source; and a focusing mechanism, the focusing mechanism comprising a camera lens, and the camera lens being movable along an axis direction thereof to adjust a focal distance, wherein the core rack is provided with an open groove, and the film mechanism is movably inserted into the open groove.

7. The projection lamp according to claim 6, wherein the core rack comprises an upper rack body and a lower rack body that are snap-fitted with each other; the lower rack body is provided with a tube sleeve; the light source is located at a bottom of the tube sleeve; the light gathering cup and the lens are sequentially arranged in the tube sleeve; the tube sleeve is sleeved inside the rotary column; the open groove is formed at the upper rack body; and the focusing mechanism is connected to the upper rack body.

8. The projection lamp according to claim 7, wherein the focusing mechanism further comprises a focusing seat, a clamping seat and a nut; a top of the upper rack body is provided with a mounting hole; the nut is arranged in the mounting hole; the camera lens is connected to the clamping seat; the clamping seat is mounted in the focusing seat; a surface of an inner side surface of the nut is provided with an internal thread; and a surface of an outer side wall of the camera lens is provided with an external thread matching with the internal thread.

9. The projection lamp according to claim 6, further comprising a housing for accommodating the core rack, and a base arranged on the housing, wherein the base is provided with a pair of support arms; the pair of support arms are respectively rotatably connected to two sides of the housing, thereby realizing adjustment of different projection angles.

10. The novel plug-in film structure according to claim 1, wherein the film assembly comprises a film holder, a film cover and a film sheet, the film sheet is arranged in the film holder, and the film cover covers a top of the film holder, the film holder being detachably mounted in the fixing seat.

11. The novel plug-in film structure according to claim 1, wherein both the seat and the second magnetic element are ring-shaped; and a bottom of the fixing seat is provided with an annular slot, and the magnetic ring is embedded in the annular slot.

12. A novel plug-in film structure, comprising a rotary motor, a rotating shaft of the rotary motor being provided with rotary teeth, wherein the novel plug-in film structure further comprises a gear mechanism and a film mechanism, one end of the gear mechanism is meshed with the rotary teeth, and the film mechanism is magnetically connected to the other end of the gear mechanism; and when the rotary motor rotates, a film sheet in the film mechanism magnetically connected to the gear mechanism rotates synchronously;

wherein the gear mechanism comprises a rotary column, and a first magnetic element arranged on a top of the rotary column;

the film mechanism comprises a tray, a magnetic assembly, and a film assembly; the film assembly is arranged in the magnetic assembly; the magnetic assembly is movably arranged in the tray; during magnetic connection, the first magnetic element and the magnetic assembly magnetically attract each other; and when the rotary motor rotates, the magnetic assembly and the film assembly rotate synchronously;

wherein the magnetic assembly comprises a seat and a second magnetic element, the second magnetic element is arranged at a bottom of the seat, the film assembly is arranged on the seat and is spaced apart from the second magnetic element by the seat, and the seat is movably arranged in the tray, when the seat is magnetically connected, the first magnetic element and the second magnetic element magnetically attracting each other.

13. The novel plug-in film structure according to claim 12, wherein both the seat and the second magnetic element are ring-shaped.

14. The novel plug-in film structure according to claim 13, wherein the film assembly comprises a film holder, a film cover and a film sheet, the film sheet is arranged in the film holder, and the film cover covers a top of the film holder, the film holder being detachably mounted in the fixing seat.

* * * * *